(12) United States Patent
Maeda et al.

(10) Patent No.: US 7,779,084 B2
(45) Date of Patent: *Aug. 17, 2010

(54) PROCESS MIGRATION METHOD COMPUTER AND SYSTEM

(75) Inventors: Seiji Maeda, Kawasaki (JP); Kiyoko Sato, Yokohama (JP); Nobuo Sakiyama, Kawasaki (JP); Hirokuni Yano, Tokyo (JP); Takuya Hayashi, Komae (JP)

(73) Assignee: Kabushiki Kaisha Toshiba, Tokyo (JP)

(*) Notice: Subject to any disclaimer, the term of this patent is extended or adjusted under 35 U.S.C. 154(b) by 240 days.

This patent is subject to a terminal disclaimer.

(21) Appl. No.: 11/943,005

(22) Filed: Nov. 20, 2007

(65) Prior Publication Data

US 2008/0077706 A1  Mar. 27, 2008

Related U.S. Application Data

(63) Continuation of application No. 10/640,330, filed on Aug. 14, 2003, now Pat. No. 7,313,599.

(30) Foreign Application Priority Data

Aug. 14, 2002  (JP) .............................. 2002-236432

(51) Int. Cl.
  *G06F 15/16* (2006.01)
(52) U.S. Cl. ....................... 709/213; 709/203; 709/248; 718/108; 714/15
(58) Field of Classification Search ......... 709/201–203, 709/208–209, 212–213, 220, 248; 718/108; 714/15

See application file for complete search history.

(56) References Cited

U.S. PATENT DOCUMENTS

| | | | |
|---|---|---|---|
| 5,127,098 A | * | 6/1992 | Rosenthal et al. ........... 711/202 |
| 5,748,882 A | | 5/1998 | Huang |
| 6,026,499 A | | 2/2000 | Shirakihara et al. |
| 6,047,122 A | * | 4/2000 | Spiller ........................ 718/108 |
| 6,078,944 A | * | 6/2000 | Enko et al. .................. 718/105 |
| 6,185,702 B1 | | 2/2001 | Shirakihara et al. |
| 6,434,710 B1 | | 8/2002 | Sato et al. |

(Continued)

FOREIGN PATENT DOCUMENTS

JP  2000-222376  8/2000

OTHER PUBLICATIONS

M.M. Theimer, et al., $10^{th}$ ACM Symposium on Operating Systems Principles, pp. 2-12, "Preemptable Remote Execution Facilities for the V-System", 1995.

*Primary Examiner*—William C Vaughn, Jr.
*Assistant Examiner*—Mohamed Ibrahim
(74) *Attorney, Agent, or Firm*—Oblon, Spivak, McClelland, Maier & Neustadt, L.L.P.

(57) ABSTRACT

Process migration method includes copying first process context indicative of first processing, transmitting process context to second computer, causing first computer to start generation of first execution record, causing second computer to receive process context, determining, from first execution record, whether first processing should be migrated, if it is determined that first processing should postpone being migrated, finishing generation of first execution record, starting generation of second execution record, transmitting first execution record to second computer, reproducing process context, and determining, from second execution record, whether first processing should be migrated, after reproducing of process context is finished in the second computer.

3 Claims, 4 Drawing Sheets

U.S. PATENT DOCUMENTS 6,542,991 B1 * 4/2003 Joy et al. .................... 712/228
6,615,223 B1 * 9/2003 Shih et al. ........................ 1/1
6,725,262 B1 * 4/2004 Choquier et al. ............ 709/221
6,964,047 B2 * 11/2005 Fenchel ...................... 718/102

* cited by examiner

| Execution records 110 | |
|---|---|
| Contents of request 402 | Execution results 403 |
| Acquire present time | 2002/6/4 20:30 404 |
| Read file | [Read data] 405 |
| Write data to file [write data] | Succeed |

FIG. 4

PROCESS MIGRATION METHOD COMPUTER AND SYSTEM

CROSS-REFERENCE TO RELATED APPLICATIONS

This application is based upon and claims the benefit of priority from U.S. application Ser. No. 10/640,330, filed Aug. 14, 2003, and from prior Japanese Patent Application No. 2002-236432, filed Aug. 14, 2002, the entire contents of which are incorporated herein by reference.

BACKGROUND OF THE INVENTION

1. Field of the Invention

The present invention relates to a process migration method, computer and system for copying, to another computer node, the process currently executed on a certain computer node, and a computer having such a copying function.

2. Description of the Related Art

A computer system formed of a plurality of computer nodes employs a process migration technique for copying, to another computer node, the process currently executed on a certain computer node, in order to reduce the load on a certain computer.

Specifically, the process migration technique is a technique for copying, to another computer node, the state of the process (process context) currently executed on a certain computer node, thereby enabling another computer to continue the execution of the process using the copied process context. The process context specifically means data (including codes) in a memory space used in the process, register values indicative of the state of a central processing unit (CPU), and information in a file opened in the process, etc.

In a computer system including a plurality of computer nodes, if a load is concentrated on a certain computer node, and other computer nodes have a spare processing capability, the process migration technique enables the process executed on the overloaded computer node to be copied to other computer nodes, thereby equalizing the load on the computer nodes. In general, if the load on a computer system is equalized, the response time and throughput of the computer system can be enhanced.

Since recent computer nodes incorporate a large-capacity memory to enhance their processing capability, there is a growing tendency for a large memory capacity to be needed in a process. Accordingly, the amount of data of a process context is becoming very large. The period required for data communication between computer nodes increases with the amount of communication data. Therefore, the period required for a process context to be copied between computer nodes is increasing.

In the conventional process migration technique, to prevent a process context from being updated during process migration, the execution of the process to be copied is once stopped, as is disclosed in, for example, Jan. Pat. Appln. KOKAI Publication No. 2000-222376. Therefore, a user utilizing the computer system may think the computer system is hung.

Further, "Preemptable and remote execution facilities for the V-system" (M. Theimer, K. Lantz and D. Cheriton in 10th ACM Symposium on Operating Systems Principles, pages 2-12, 1985) discloses a technique called "PreCopy". In this technique, all contents of a process context in a memory space used in a process are copied to a destination computer node during the execution of the process on an originator computer node. After the copying operation, the process is continued and then finished on the originator computer node. When this process is finished, the contents of the process context, which have been changed on the originator computer node after they are copied to the destination computer node, are also copied to the destination computer node, together with data indicative of the state of the process.

However, if a lot of time is required for copying the contents in the memory space, as stated above, a large amount of contents are changed by the execution of the process during copying, therefore a lot of time is required to copy data indicative of the changed contents to the destination computer node. As a result, a user may think that the computer system is hung for a long time.

As described above, in the conventional process migration technique, the execution of a process is temporarily stopped. Since, however, there is a tendency for the period required for copying a process context between computer nodes to increase, a user utilizing the computer system may think that the computer system is hung for a long time.

BRIEF SUMMARY OF THE INVENTION

It is an object of the invention to provide a process migration method, a computer and a system and computer capable of minimizing the period of process stop during process migration, to enhance the response performance of the computer for users.

According to a first aspect of the invention, there is provided a process migration method for performing a process migration between a first computer and a second computer which are connected via a network, comprising: (a) copying a process context indicative of first processing which the first computer executes; (b) transmitting the process context to the second computer; (c) causing the first computer to start generation of a first execution record concerning the first processing when the process context is started to be transmitted; (d) causing the second computer to receive the process context, (e) determining, from the first execution record, whether or not the first processing should be migrated from the first computer to the second computer;

if it is determined that the first processing should postpone being migrated from the first computer to the second computer, (f) finishing the generation of the first execution record, (g) starting generation of a second execution record, (h) transmitting the first execution record to the second computer, the generation of the first execution record being finished, (i) reproducing the process context in the second computer, and (j) determining, from the second execution record, whether or not the first processing should be migrated from the first computer to the second computer, after reproducing of the process context is finished in the second computer.

According to a second aspect of the invention, there is provided a computer serving as a first computer which copies, to a second computer via a network, a process context indicative of processing which the first computer executes, comprising; a copy unit configured to copy the process context; a first transmission unit configured to transmit the process context to the second computer; a first generation unit configured to generate a first execution record concerning the processing when the process context is started to be transmitted; a determination unit configured to determine, from the first execution record, whether or not the processing should be migrated from the first computer to the second computer;

if the determination unit determines that the processing should postpone being migrated, a first finishing unit configured to finish the generation of the first execution record, a second generation unit configured to generate a second execution record, a second transmission unit to transmit the first execution record to the second computer, the generation of the first execution record being finished, and a receiving unit configured to receive, from the second computer, a first message expressing that reproduction based on the first execution record is finished, the determination unit determining, from the second execution record, whether or not the processing should be migrated from the first computer to the second computer, after the receiving unit receives the first message.

According to a third aspect of the invention, there is provided a system including a first computer and a second computer which are connected via a network, the first computing executing first processing indicated by a process context, the first computer comprising: a copy unit configured to copy the process context; a first transmission unit configured to transmit the process context to the second computer; a generation unit configured to generate a first execution record concerning the processing when the process context is started to be transmitted; a determination unit configured to determine, from the first execution record, whether or not the first processing should be migrated from the first computer to the second computer;

if the determination unit determines that the first processing should postpone being migrated, a first finishing unit configured to finish the generation of the first execution record, a second generation unit configured to generate a second execution record based on the first execution record, a second transmission unit configured to transmit the first execution record to the second computer, the generation of the first execution record being finished, and a first receiving unit configured to receive, from the second computer, a first message expressing that reproduction based on the second execution record is finished, the second computer comprising: a second receiving unit configured to receive the process context; a third receiving unit configured to receive the first execution record; a fourth receiving unit configured to receive a determination result determined by the determination unit, if the determination result indicates that the first processing should postpone being migrated, a fifth receiving unit configured to receive the second execution record, a third transmission unit configured to transmit the first message, and a fourth transmission unit configured, to the first computer, to transmit a control signal which controls the determination unit so as to again determine whether or not the first processing should be migrated from the first computer to the second computer, the control signal being transmitted after the reproduction of the process context is finished in the second computer.

DETAILED DESCRIPTION OF THE INVENTION

A process migration method, a compute and a system according to an embodiment of the invention will be described with reference to the accompanying drawings.

Firstly, the outline of the embodiment will be described.

The process migration method of an embodiment is suitable for copying a process from a certain computer node (hereinafter referred to as an "originator computer node") to another computer node (hereinafter referred to as a "destination computer node") connected thereto via a network.

For facilitating the description, in the embodiment, only two computer nodes, i.e., an originator computer node and destination computer node, are connected to a network. Of course, three or more computer nodes may be connected.

The originator computer node is provided with an execution-record-recording device for recording the execution results (records) of a to-be-copied process. On the other hand, the destination computer node is provided with an execution reproduction device for reproducing the execution results recorded by the execution-record-recording device. The execution-record-recording device and execution-record reproduction device are used to make a copied process on the destination computer node accord to an original process on the originator computer node.

At the start of process migration, on the originator computer node, a copy of the contents in a memory space used in a to-be-copied process is generated. After the generation of the copy, the execution results of the to-be-copied process (i.e., the original process) are sequentially recorded in the execution-record-recording device, while the execution of the to-be-copied (original) process is continued.

The execution results to be recorded include, for example, an argument and its results, etc. used for calling an operating system or library. In the embodiment, to estimate the period required for reproduction in the destination computer based on the execution results, the rate of use of the CPU in the to-be-copied (original) process is also recorded as an execution result.

The copy of the contents in the memory space used in the to-be-copied process, performed on the originator computer node, is transferred to the destination computer node via the network. On the destination computer node, the memory space is reproduced using the copy. During this operation, the execution of the to-be-copied (original) process is continued on the originator computer node, therefore a user utilizing the computer system does not think the computer system is hung.

After the transfer of the copy of the contents in the memory space used in the to-be-copied process finishes, the originator computer node estimates, from the execution results recorded in the execution-record-recording device and the rate of use of the CPU, the period required for reproduction of the execution results on the destination computer node. The estimated required period determines whether the following process (A) or (B) should be executed:

(A) If the period required for the reproduction based on the execution results, estimated by the originator computer node, is enough to be short, copying of the to-be-copied process is performed on the destination computer node. To this end, the execution results are copied to the destination computer node, and at the same, the to-be-copied process currently executed on the originator computer node is cancelled. After that, the originator computer node informs the destination computer node of the fact that the original process has been cancelled.

(B) If the period required for the reproduction based on the execution results, estimated by the originator computer node, is still long, the originator computer node continues the process. To this end, the execution records are copied to the destination computer node, and the execution of the process is continued on the originator computer node, thereby updating the execution results (records).

The execution reproduction device of the destination computer node reproduces the execution records on the basis of the execution records recorded in the originator computer node, thereby causing the state of the copy of the process to accord to the updated, recorded state of the original process.

In the reproduction operation, the call-up results of the operating system or library recorded as execution records are used instead of actually calling up the operating system or library. Therefore, the period required for calling up them is not needed. Accordingly, the CPU can be used only for reproduction, and the period required for reproduction is (the whole execution period X the rate of use of the CPU). In other words, reproduction of execution records can be performed at a higher speed than the actual execution of a process.

Accordingly, in the case (B), it is considered that the amount of execution result data newly recorded on the originator computer node during reproduction on the destination computer node is smaller than that of previous execution result data. Therefore, except for an exceptional case described later, the amount of execution result data becomes smaller when recording and reproduction of execution result data is repeated, and the period required for reproduction of execution result data can be accordingly minimized.

If the rate of use of the CPU in the original process is exceptionally near 100%, there is almost no time difference between the reproduction of execution result data and usual processing, therefore the period required for the reproduction of execution result data cannot substantially be reduced even if recording and reproduction of execution result data is repeated. In this case, instead of the repetition processing, the operation is shifted to a process on the destination computer node.

The destination computer node executes a to-be-copied process on the basis of received execution records. After all execution records have been reproduced, the copied state of the process is the same as the state of the original process on the originator computer node corresponding to execution records of the final stage.

If at this time, the original process is already cancelled on the originator computer node, the copied state of the to-be-copied process on the destination computer node is an updated state.

When the originator computer node informs the destination computer node that the original process has been cancelled, the remaining processing of the original process is performed on the destination computer node, using the copied process. This is the termination of process migration.

Further, when the original process is continued on the originator computer node, the destination computer node again estimates the period required for reproducing the execution records, on the basis of the execution records and the rate of use of the CPU that are newly recorded on the destination computer node, and repeats the transfer and reproduction processing of execution records.

The above-described processing can reduce the period required for reproducing execution records, which is equal to the period required for copying a process from an originator computer node to a destination computer node. As a result, the temporary stop period of a process can be further reduced.

Figure 1:
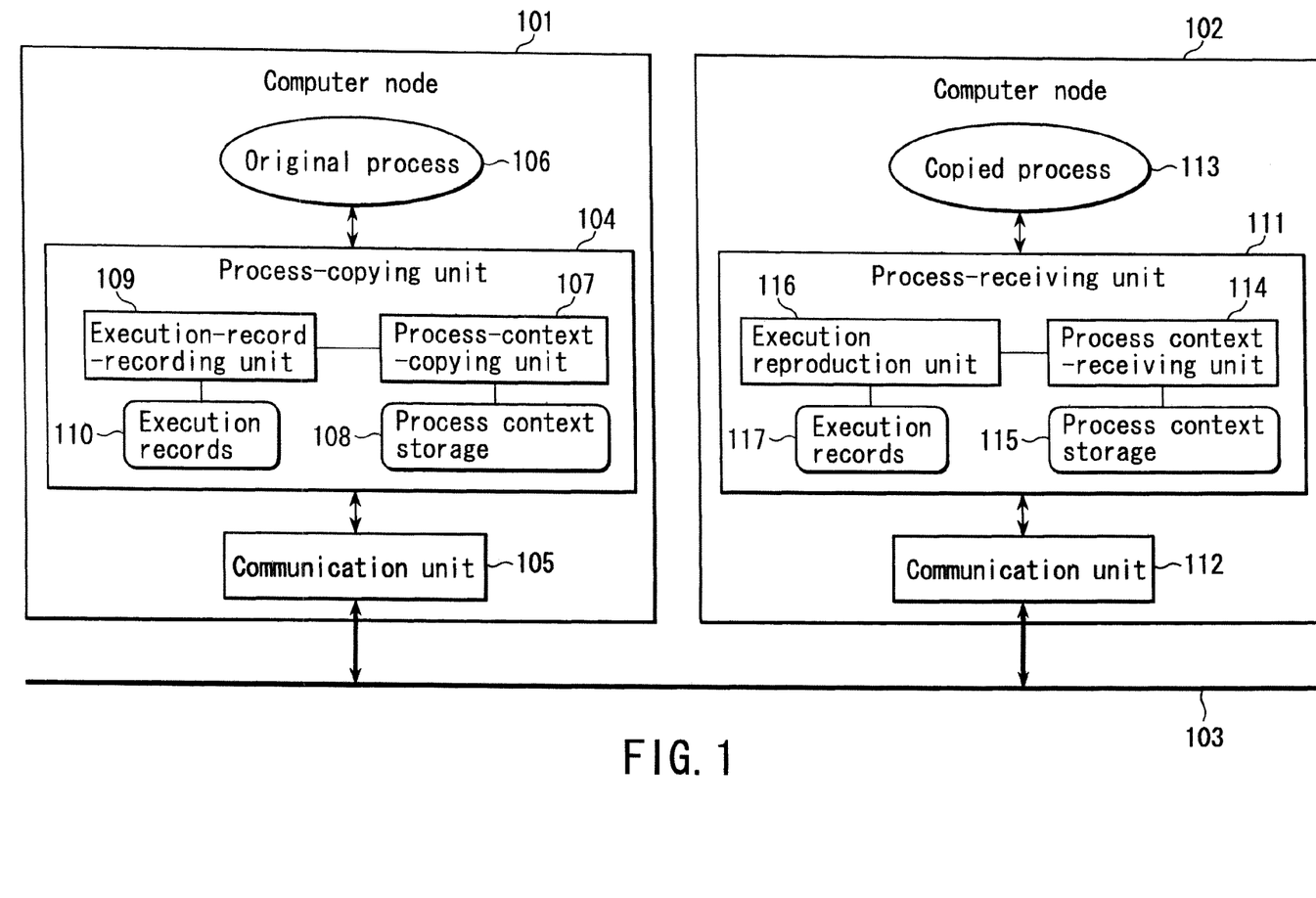
FIG. 1 is a block diagram illustrating an embodiment of the structure of a computer node system to which a process migration method according to the embodiment is applied.

Referring to FIG. 1, the structure of the embodiment will be described.

FIG. 1 shows a computer system comprising computer nodes 101 and 102 connected via a communication line 103.

The computer node 101 comprises a process-copying unit 104 for copying a to-be-copied (original) process 106 to the computer node 102 as a destination node, and a communication unit 105 for communication with the computer node 102.

The process-copying unit 104 is formed of a process-context-copying unit 107 and execution-record-recording unit 109. The process-context-copying unit 107 manages a process context storage 108, and the execution-record-recording unit 109 manages execution records 110.

The computer node 102 comprises a process-receiving unit 111 for receiving a copy of the original process 106 from the computer node 101 and generating a copied process 113, and a communication unit 112 for communication with the computer node 101.

The process-receiving unit 111 is formed of a process context-receiving unit 114 and execution reproduction unit 116. The process context-receiving unit 114 manages a process context storage 115, and the execution reproduction unit 116 manages execution records 117.

Although in the embodiment, one computer node employs either a process copy unit or process-receiving unit, it may employ both the units. In the latter case, process migration can be performed bidirectionally.

(Process Migration at Originator Node) Referring to the flowchart of FIG. 2, process migration processing performed by the computer node 101 as the originator will be described.

Figure 2:
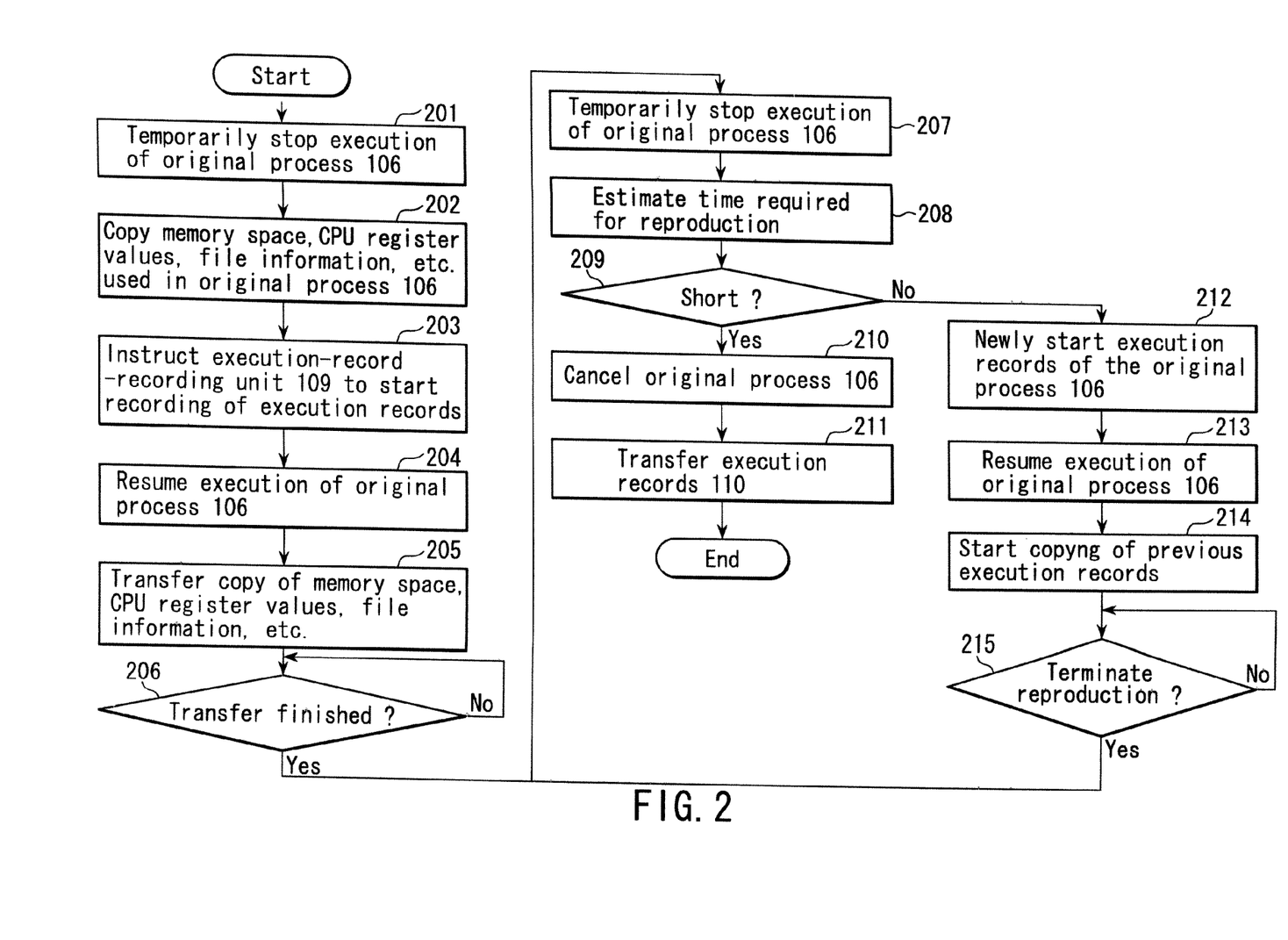
FIG. 2 is a flowchart useful in explaining processing included in an embodiment of the process migration method and executed by a computer node that copies a process to another computer node.

(Transfer of Process Context) The steps 201-206 of the flowchart of FIG. 2 illustrate the processing performed by the process-context-copying unit 107 to transfer a copy of the contents in a memory space used in the original process 106.

Firstly, the process-context-copying unit 107 temporarily stops the execution of the original process 106 (step 201), then generates a copy of information used in the original process 106, such as CPU register values, file information, etc. and a copy of the contents in a memory space used in the original process 106, and stores them into the process context storage 108 (step 202).

Subsequently, the process-context-copying unit 107 instructs the execution-record-recording unit 109 to start recording of the execution results of the original process 106 (step 203), and resumes the execution of the original process 106 (step 204).

After that, the process-context-copying unit 107 transfers, to the computer node 102, the copy of the information such as CPU register values, file information, etc. and the copy of the contents in the memory space stored in the process context storage 108 (step 205).

Thereafter, the process-context-copying unit 107 waits for the completion of transfer of the contents (step 206).

(Recording of Execution Records, Shifting of Processing) Referring now to steps 207 et seq., recording of execution records by the execution-record-recording unit 109 and shifting of processing will be described.

After receiving an instruction to start recording at the step 203, the execution-record-recording unit 109 records, as execution records 110, the execution records of the original process 106.

Upon receiving a message that reproduction is started, the execution-record-recording unit 109 temporarily stops the execution of the original process 106 (step 207), and estimates the period required for reproducing the accumulated execution records 110 (step 208). In the embodiment, the estimation of the period required for reproduction is performed on the basis of execution results recorded as execution records 110, the rate of use of the CPU, the amount of the execution records 110, etc. If simple estimation is preferred, the required period may be determined only from the data amount of the execution records 110, without considering the contents of the records 110.

The estimated period is compared with a predetermined reference period (step 209). If the former is shorter than the predetermined reference period, the original process 106 is cancelled (step 210), thereby supplying the execution reproduction unit 116 with a message that the execution records 110 and the original process 106 have been cancelled (step 211).

On the other hand, if the required period is equal to or longer than the reference period, the execution-record-recording unit 109 finishes recording of the present execution records of the original process 106, then starts recording of new execution records (step 212), resumes the execution of the original process 106 (step 213), supplies the computer node 112 with information and previous execution records 110 (i.e., the execution records obtained at the step 212) (step 214), and waits for the completion of reproduction (step 215).

(Process Migration at Destination Node) Referring to the flowchart of FIG. 3, a description will be given of process migration performed at the computer node 102 as the destination node.

Figure 3:
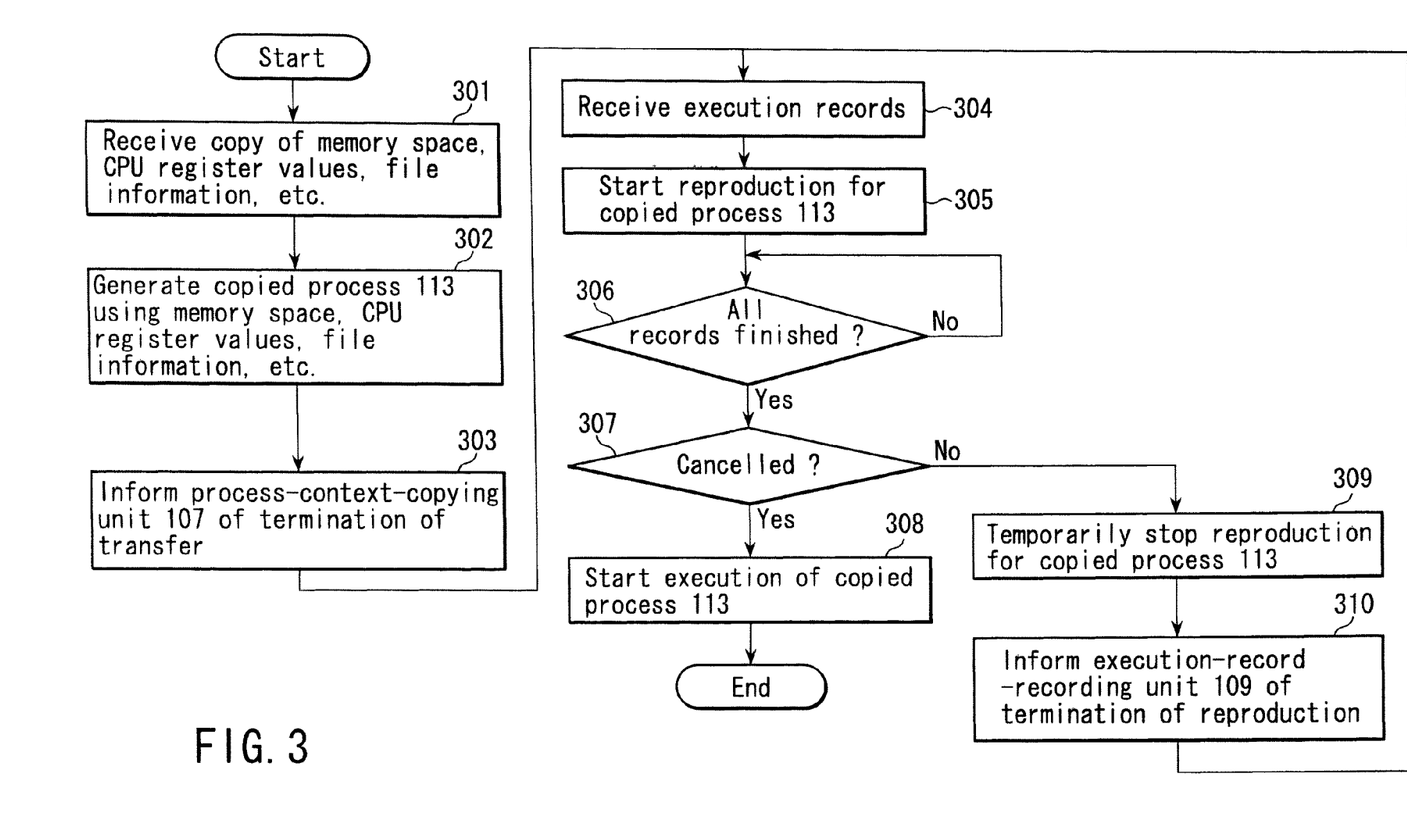
FIG. 3 is a flowchart useful in explaining processing included in an embodiment of the process migration method and executed by a computer node to which a process is copied.

(Transfer of Process Context) The steps 301-303 of FIG. 3 illustrate the processing of the process context-receiving unit 114 to receive a copy of the contents in a memory space used in the original process 106.

The process context-receiving unit 114 receives the information such as CPU register values, file information, etc. and the contents in the memory space transmitted from the computer node 101 via the communication unit 112, stores them into the process context storage 115 (step 301), and generates a copied process 113 (=restoration of the original process 106) using the information such as CPU register values, file information, etc. and the contents in the memory space (step 302).

After completion of restoration of the process, the process context-receiving unit 114 informs the process-context-copying unit 107 that the transfer of the information such as CPU register values, file information, etc. and the contents in the memory space has been finished (step 303).

(Reproduction of Execution Records) Steps 304 et seq. of FIG. 3 illustrate reproduction of execution records in the execution reproduction unit 116.

The execution reproduction unit 116 receives execution records from the execution-record-recording unit 109, and accumulates them as execution records 117 (step 304). After that, the unit 116 starts reproduction of the copied process 113 using, for example, the received execution records (step 305).

After finishing reproduction of all execution records (step 306), the unit 116 confirms whether or not the original process 106 is cancelled (step 307).

If the original process 106 is cancelled, this means that the to-be-copied process has completely been copied, therefore the execution of the copied process 113 is started (step 308).

If the original process 106 is not cancelled, the reproduction of the copied process 113 is temporarily stopped (step 309), thereby informing the execution-record-recording unit 109 that reproduction is finished (step 310).

As described above, continuous execution of an original process on an originator computer node during process migration enables a user utilizing the computer to think that the computer is operating even during process migration. Further, if a lot of time is required for reproduction of execution records, the period of stopping the process can be further reduced by repeatedly performing the recording and reproduction of execution records.

Figure 4:
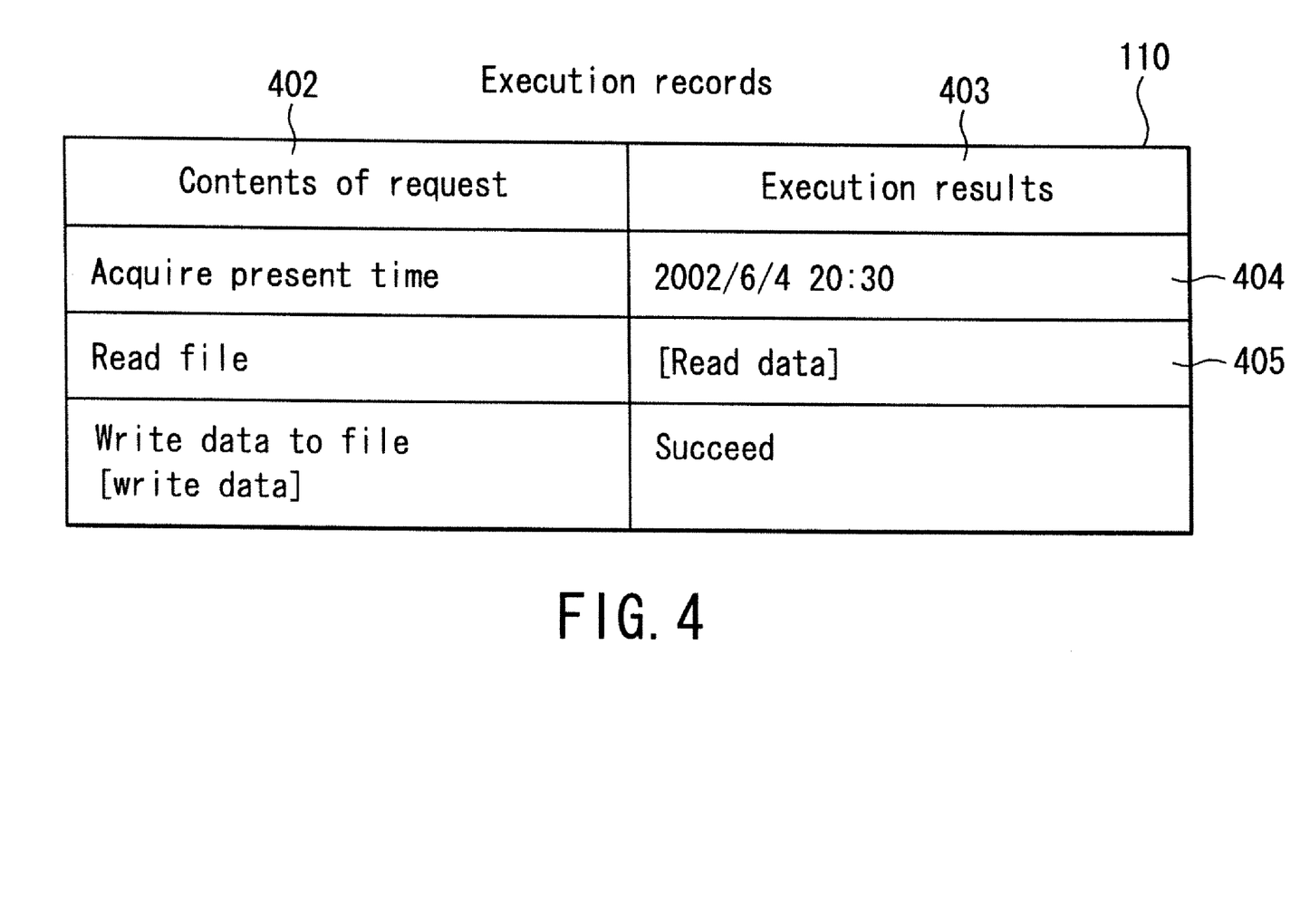
FIG. 4 is a view illustrating an execution record data example in an embodiment of the process migration method.

(Examples of Execution Records) Examples of execution records 110 are shown in FIG. 4.

The execution records 110 comprise the contents 402 of requests and execution results 403 in a process.

For example, data "2002/6/4 20:30" is recorded as a result 404 obtained by the execution of a request "Acquire Present Time". Accordingly, even if, in a copied process, the data "Acquire Present Time" is reproduced after "2002/6/4 20:30", for example, at "2002/6/4 20:33", the data "2002/6/4 20:30" is correctly reproduced. Thus, the states of the original process and copied process can be made identical.

Further, read data is recorded as a result 405 obtained by the execution of a request "Read Data from File". In general, files are recorded in a device, such as an HDD (hard disk drive), which is of a much slower access speed than, for example, a memory. In light of this, to reproduce execution records, the execution records are read from a memory, which differs from a usual process where execution records are read from an HDD. Accordingly, reproduction can be executed at a higher speed than usual processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process migration method for performing a process migration between a first computer and a second computer which are connected via a network, comprising:
copying a process context indicative of first processing which the first computer executes;
transmitting the process context to the second computer;
causing the first computer to start generation of a first execution record concerning the first processing when the process context is started to be transmitted;
causing the second computer to receive the process context;
determining, from the first execution record, whether or not the first processing should be migrated from the first computer to the second computer;
if it is determined that the first processing should not be migrated from the first computer to the second computer,
finishing the generation of the first execution record;
starting generation of a second execution record;
causing the first computer to resume the execution of the first processing;
transmitting the first execution record to the second computer, the generation of the first execution record being finished;
reproducing the process context in the second computer; and
determining, from the second execution record, whether or not the first processing should be migrated from the first computer to the second computer, after reproducing of the process context is finished in the second computer,
wherein if it is determined that the first processing should be migrated,
finishing execution of the first processing;
finishing generation of the first execution record;
transmitting the first execution record to the second computer;
reproducing the process context in the second computer; and causing the second computer to start execution of second processing indicated by the process context after the process context is reproduced.

2. A computer serving as a first computer which copies, to a second computer via a network, a process context indicative of processing which the first computer executes, comprising:

a copy unit configured to copy the process context;

a first transmission unit configured to transmit the process context to the second computer;

a first generation unit configured to generate a first execution record concerning the processing when the process context is started to be transmitted;

a determination unit configured to determine, from the first execution record, whether or not the processing should be migrated from the first computer to the second computer;

a first finishing unit configured to finish the generation of the first execution record, if the determination unit determines that the processing should not be migrated;

a second generation unit configured to generate a second execution record, if the determination unit determines that the processing should not be migrated;

a resuming unit configured to resume the execution of the processing, if the determination unit determines that the processing should not be migrated;

a second transmission unit configured to transmit the first execution record to the second computer, the generation of the first execution record being finished, if the determination unit determines that the processing should not be migrated; and a receiving unit configured to receive, from the second computer, a first message expressing that reproduction based on the first execution record is finished, if the determination unit determines that the processing should not be migrated, the determination unit determining, from the second execution record, whether or not the processing should be migrated from the first computer to the second computer, after the receiving unit receives the first message.

3. A system including a first computer and a second computer which are connected via a network, the first computing executing first processing indicated by a process context, the first computer comprising:

a copy unit configured to copy the process context;

a first transmission unit configured to transmit the process context to the second computer;

a generation unit configured to generate a first execution record concerning the processing when the process context is started to be transmitted;

a determination unit configured to determine, from the first execution record, whether or not the first processing should be migrated from the first computer to the second computer;

a first finishing unit configured to finish the generation of the first execution record, if the determination unit determines that the first processing should not be migrated;

a second generation unit configured to generate a second execution record based on the first execution record, if the determination unit determines that the first processing should not be migrated;

a resuming unit configured to resume the execution of the first processing, if the determination unit determines that the first processing should not be migrated;

a second transmission unit configured to transmit the first execution record to the second computer, the generation of the first execution record being finished, if the determination unit determines that the first processing should not be migrated; and a first receiving unit configured to receive, from the second computer, a first message expressing that reproduction based on the second execution record is finished, if the determination unit determines that the first processing should not be migrated;

the second computer comprising:

a second receiving unit configured to receive the process context;

a third receiving unit configured to receive the first execution record;

a fourth receiving unit configured to receive a determination result determined by the determination unit, a fifth receiving unit configured to receive the second execution record, if the determination result indicates that the first processing should not be migrated;

a third transmission unit configured to transmit the first message, if the determination result indicates that the first processing should not be migrated; and a fourth transmission unit configured to transmit, to the first computer, a control signal which controls the determination unit so as to again determine whether or not the first processing should be migrated from the first computer to the second computer, the control signal being transmitted after the reproduction of the process context is finished in the second computer, if the determination result indicates that the first processing should not be migrated.

* * * * *